United States Patent [19]

Garlick et al.

[11] Patent Number: 5,212,571
[45] Date of Patent: May 18, 1993

[54] ULTRASONIC HOLOGRAPHIC IMAGING APPARATUS HAVING ZOOM FEATURE

[75] Inventors: George F. Garlick; Victor I. Neeley, both of Kennewick, Wash.

[73] Assignee: Advanced Imaging Systems, Richland, Wash.

[21] Appl. No.: 796,714

[22] Filed: Nov. 22, 1991

[51] Int. Cl.⁵ .................... G03H 3/00; G01N 29/04
[52] U.S. Cl. .................................... 359/9; 73/603; 73/605; 359/901
[58] Field of Search ............... 359/9, 901; 367/150, 367/8, 10; 73/603, 605

[56] References Cited

U.S. PATENT DOCUMENTS

| | | | |
|---|---|---|---|
| 3,559,465 | 2/1971 | Preston, Jr. | 73/603 |
| 3,715,482 | 2/1973 | Haines et al. | 73/603 |
| 3,721,312 | 3/1973 | St. John | 73/603 |
| 3,772,457 | 11/1973 | Macovski | 359/901 |
| 3,802,533 | 4/1974 | Brenden . | |
| 3,818,427 | 6/1974 | Pekau et al. | 73/603 |
| 3,832,888 | 9/1974 | Langlois | 73/605 |
| 3,864,665 | 2/1975 | Pekau | 73/603 |
| 3,869,904 | 3/1975 | Gabor | 73/605 |
| 3,964,052 | 6/1976 | Langlois | 73/605 |
| 3,983,529 | 9/1976 | Langlois | 73/605 |
| 4,093,382 | 6/1978 | Kurtz | 359/901 |

FOREIGN PATENT DOCUMENTS 54-43046  5/1979  Japan .................. 359/901

OTHER PUBLICATIONS

W. Kock, "Acoustics and Optics," *Applied Optics*, vol. 8, No. 8, Aug. 1969, pp. 1525 to 1531.
Mueller et al., "Sound Holograms and Optical Reconstruction," *Applied Physics Letters*, vol. 9, No. 9, Nov. 1, 1966, pp. 328 to 329.

Primary Examiner—Martin Lerner
Attorney, Agent, or Firm—Wells, St. John, Roberts, Gregory & Matkin

[57] ABSTRACT

The preferred embodiment of this invention is illustrated in FIG. 2 showing an ultrasonic holographic imaging apparatus 50 having a multiple lens system 52 that is capable of providing both zoom and focus capability. The system 52 includes lens 54 and 56 that are independently mounted on lead screws 62 and 64 for movement relative to each other along an optical axis 57. The movement of the system is controlled by drive system 66 and 68 that have encoders 72 and 74 for accurately positioning the lens 54 and 56 relative to each other in response to signals from a microcontroller 76. The microcontroller 76 is operator controlled through control device 78 and 80 to provide both zoom capability and a focus capability.

9 Claims, 3 Drawing Sheets

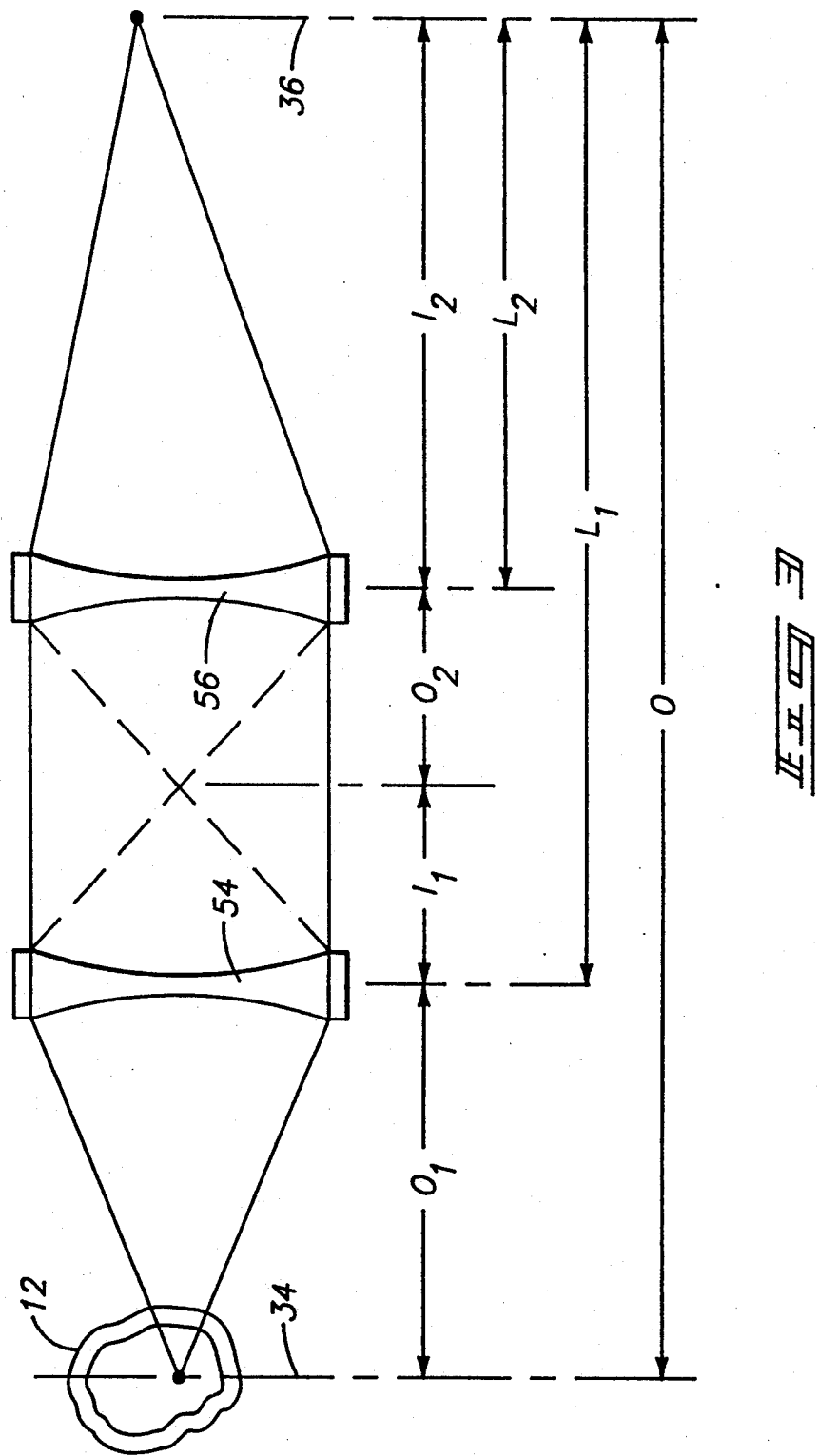

ULTRASONIC HOLOGRAPHIC IMAGING APPARATUS HAVING ZOOM FEATURE

TECHNICAL FIELD

This invention relates to ultrasonic holographic imaging apparatus for viewing imaged holographic information of the internal structure of an object at different magnifications.

BACKGROUND OF THE INVENTION

Although commercial application of ultrasonic holography as been accurately pursued by many persons in the scientific and industrial communities for many years, only limited results have been obtained even though it was once thought that ultrasonic holography held great promise. It was felt that the application of ultrasonic holography was particularly applicable to the fields of nondestructive testing of materials and medical diagnostics of soft tissues that are relatively transparent to ultrasonic radiation. One of the principal problems that has been encountered and not effectively resolved is the difficulty of obtaining quality and consistent images. A further problem has been the inability to vary the magnification of the image while maintaining a consistent high quality image.

As background, FIG. 1 shows a typical "real time" prior art ultrasonic holographic imaging system generally designated with the numeral 10. The system 10 is intended to ultrasonically inspect the interior of an object 12 such as the soft tissue of a human limb. The ultrasonic holographic imaging system 10 generally has a hologram generating subsystem 14 for generating an ultrasonic hologram. The system 10 also includes a hologram viewing subsystem (optical-subsystem) 16 for optically viewing the interior of the object 12 from a first order diffraction from the formed ultrasonic hologram.

The subsystem 14 includes an object ultrasonic transducer 18 for generating plane waves through a liquid or gel coupling medium 20 contained in a deformable membrane 22. The deformable membrane 22 intimately contacts the object 12 on one side and a deformable membrane 24 contacts the object on the other side to provide ultrasonic coupling with minimum energy loss or wave distortion. The deformable membrane 24 forms part of the side wall of a container 28 that contains a liquid coupling medium 30.

One of the principal components and the main concern of this invention is the provision of an ultrasonic imaging lens system 32 for viewing a large field and focusing at a desired object focal plane 34. The prior art ultrasonic imaging lens system 32 focuses the ultrasonic energy onto a hologram detector surface 36. The ultrasonic imaging lens system 32 includes a large diameter object lens 38 that is moveable with respect to a large diameter lens 40 for moving the lens to different desired focal planes 34 in the object 12. The lens 40 is stationary and is positioned at a fixed focal length from the detector surface 36. The ultrasonic imaging lens system 32 includes a mirror 41 for reflecting the ultrasonic energy approximately 90° and onto the hologram detection surface 36 to form the hologram.

A ultrasonic reference transducer 42 directs coherent ultrasonic plane waves through the liquid medium 30 at an off-axis angle to the hologram detector surface 36 to form the hologram. Preferably, the hologram detection surface 36 is the liquid/gas interface surface that is supported in an isolated dish or mini-tank 44.

The hologram viewing subsystem 16 includes an optical lens 45 to achieve an effective point source of a coherent light beam from a laser (not shown). The focused coherent light is reflect from a mirror 46 through a collimating optical lens 47 and then onto the hologram detector surface 36 to illuminate the hologram and generate diffracted optical images. The reflected coherent light radiation containing holographic information is directed back through the collimating lens 47 and separated into precisely defined diffracted orders in the focal plane of the collimating lens 47. A filter 48 is used to block all but a first diffracted order from a viewing lens 49 to enable a human eye, a photographic film or a video camera to record in "real time" the object at the object focal plane. As previously mentioned, although such a system is operable, it has been difficult to obtain quality and consistent images.

A prior art ultrasonic lens system, similar to that described, is presented in U.S. Pat. No. 3,802,533 entitled "Improvements In and Relating To Ultrasonic Lenses" granted to Byron B. Brenden. Such patent is principally directed to the specific structure of the ultrasonic lenses.

One of the principal objects and advantages of this invention is to provide an improved ultrasonic holographic imaging apparatus that has the ability to change the magnification of the image relative to the object as well as change the focus to different planes in the object while maintaining consistent high quality images.

These and other objects and advantages of this invention will become apparent upon reading the following detailed description of a preferred embodiment.

BRIEF DESCRIPTION OF THE DRAWINGS

Preferred embodiments of the invention are described below with reference to the accompanying drawings, which are briefly described below.

FIG. 3 is a schematic side elevational view of an ultrasound lens system within the apparatus as illustrated in FIG. 2 showing the spatial relationships and distances between the magnification lens and the focusing plane and the imaging plane.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
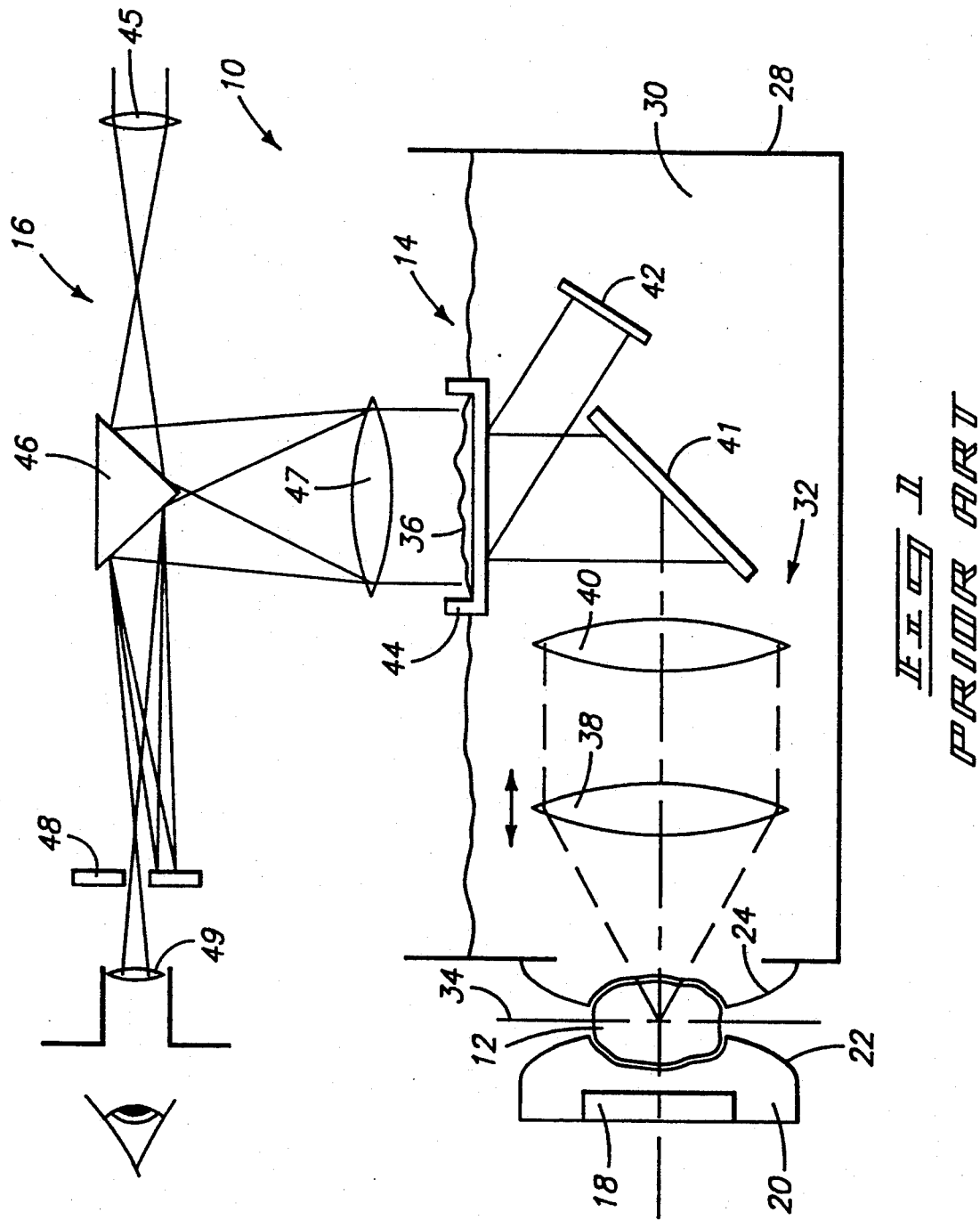
FIG. 1 is a schematic side elevational view of a prior art ultrasonic holographic imaging system illustrating the use of an ultrasonic lens system in an ultrasonic fluid transmitting medium for imaging ultrasonic holographic information to form a focused ultrasonic hologram.
Figure 2:
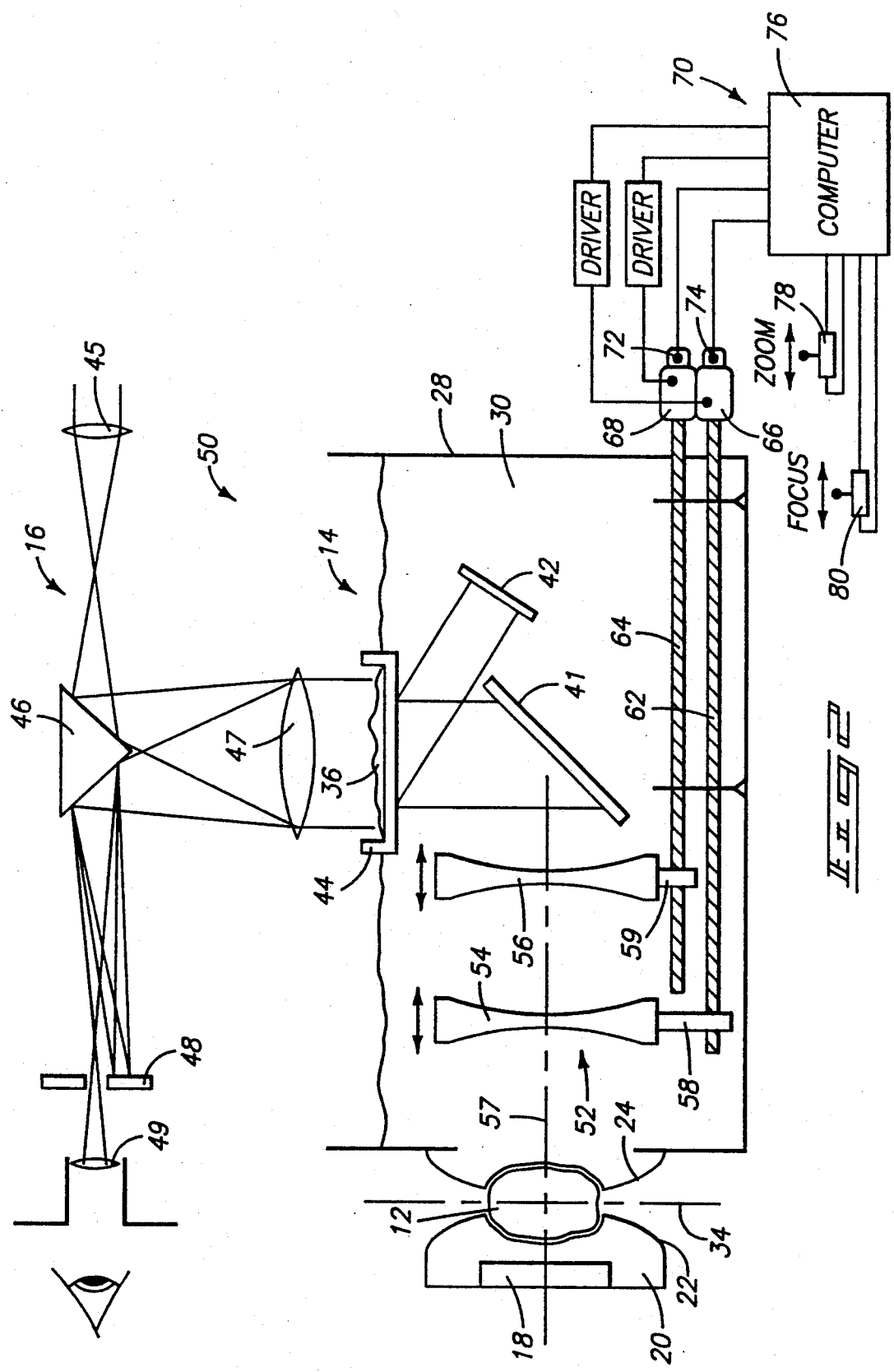
FIG. 2 is a schematic side elevational view of a preferred embodiment of this invention showing an improved ultrasonic holographic imaging apparatus capable of providing an ultrasonic hologram of different degrees of magnification as well as focusing at different planes within the volume of the object.

A preferred embodiment of the ultrasonic holographic imaging apparatus is illustrated in FIG. 2 and is designated generally with the numeral 50. Elements that are common include the same identifying numerals as in FIG. 1. In the preferred embodiment, the apparatus 50 includes a multiple lens system designated with the numeral 52 that includes two ultrasonic converging lens 54 and 56 that are aligned along an optical axis 57. The multiple lens system 52 includes a lens support 58 for supporting the lens 54 and lens support 59 for independently supporting the lens 56. Preferably, lens supports 58 and 59 include lead screws 62 and 64 respectively. The apparatus 50 includes lens support drives 66 and 68 that are connected to the lead screws 62 and 64 respectively for rotating the lead screws in either a forward or back rotation to precisely and accurately move the lens 54 and 56 relative to each other.

The ultrasonic holographic imaging apparatus 50 includes a control system generally designated with the numeral 70 that includes lead screw encoders 72 and 74 for generating coding signals that are sent to a computer or microcontroller 76 that controls the position of the lens very accurately in response to input signals from operative control devices 78 and 80. The operator control device 78 is specifically provided for providing zoom signals to the computer to cause the computer to move both of the lens 54 and 56 relative to each other and in unison to obtain the desired magnification. Preferably the magnification varies between 0.25 and 4. The operator control device 80 inputs desired signals to move principally the lens 54 to and from the object 12 to focus at desired focal planes within the object to visually inspect the volume of the object. The applicant has found that such an ultrasonic holographic imaging apparatus 50 is quite capable in providing consistent and quality images at desired magnifications as well as being able to accurately focus the lens system within the volume of the object 12 to view different structures within the object 12.

The focal object plane 34 of the multiple lens system, within the object 12 is the distance "O" and is known or selected by the operator. Similarly, the magnification of the image is selected by the operator. The magnification value is designated as "M" and given by the formula (1):

$$M = [I_1 I_2]/[O_1 O_2] \quad (1)$$

Such values are input to the computer 76 through the input devices 78 and 80. The computer 76 is programmed to receive the input values and to calculate the proper positions $L_1$ and $L_2$ for the lens 54 and 56.

The positions of lens 54, $L_1$, and 56, $L_2$ are calculated using the input values of "O" and "M" and the known focal lengths of lens 54 and 56, defined as $F_1$ and $F_2$ respectively, using the formulas (1) and (2):

$$L_1 = (-b \pm \sqrt{b^2 - 4ac})/2a \quad (2)$$

where $a = 1$ $b = -[(2MF_2)/(MF_2 + F_1)][O - F_1 + F_1/M + OF_1/2MF_2]$ $c = [MF_2/(MF_2 + F_1)][O - F_1 + F_1/M]^2 + O(F_1)^2/(MF_2 + F_1)$ $$L_2 = (MF_2/F_1)(O - L_1 - F_1) + F_2 \quad (3)$$

Such a system significantly increases the ability of an operator to observe the internal structure of an object, such as soft tissue of a human limb, at varying magnifications to make a proper medical evaluation.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An ultrasonic holographic imaging apparatus for viewing an internal structure of an object at different magnifications, comprising:
   a) a hologram detection surface;
   b) ultrasonic transducer means for (1) generating and transmitting an object ultrasonic beam through the object and onto the hologram detection surface, and (2) generating and transmitting a reference ultrasonic beam onto the hologram detection surface interfering with the transmitted object beam forming an ultrasonic hologram on the detection surface;
   c) an ultrasonic lens system interposed between the object and the hologram detection surface having at least two ultrasonic lenses aligned along a lens system axis for imaging internal structure of the object in a selected object plane onto the detection surface;
   d) a coherent light illuminating means for generating and directing a coherent light beam onto the holographic detection surface to illuminate the formed hologram and generate a diffracted beam containing an image of the internal structure of the object in the selected object plane;
   e) viewing means for viewing the image of the internal structure of the object from the hologram; and
   f) moving means for selectively moving both of the ultrasonic lenses relative to each other to change the magnification of the internal object structure on the detection surface and thereby change the size of the internal object structure in the viewed image.

2. The ultrasonic holographic imaging apparatus as defined in claim 1 wherein the ultrasonic lens system is mounted in a liquid ultrasonic coupling medium.

3. The ultrasonic holographic imaging apparatus as defined in claim 1 wherein the magnification is between 0.25 and 4 inclusive.

4. The ultrasonic holographic imaging apparatus as defined in claim 1 wherein the means for moving the lens relative to each other includes (1) a first support means for movably supporting the first lens along the lens system axis, (2) a second support means for movably supporting the second lens for movement along the lens system axis, (3) a first drive means operatively connected to the first support means for independently selectively moving the first lens along the lens system axis, and (4) a second drive means for independently selectively moving the second lens along the lens system axis.

5. The ultrasonic holographic imaging apparatus as defined in claim 4 further comprising operator control means operatively connected to the first and second drive means for moving the lenses relative to each other to vary the image magnification.

6. The ultrasonic holographic imaging apparatus as defined in claim 4 further comprising operator control means operatively connected to the first and second drive means for moving the lenses relative to each other to focus the lens system at various positions within the volume of the object.

7. The ultrasonic holographic imaging apparatus as defined in claim 6 wherein the operator control means included operator input devices operatively connected to a microcontroller for selectively controlling the first and second motors.

8. The ultrasonic holographic imaging apparatus as defined in claim 4 wherein the first and second lens support means includes separate lead screws and wherein the first and second drive means include motors for selectively rotating the lead screws.

9. The ultrasonic holographic imaging apparatus as defined in claim 4 wherein the first and second drive means includes encoders for sensing the movement of the lenses to accurately move the lenses to selected positions.

* * * * *